United States Patent
Matsuoka

(10) Patent No.: US 12,308,177 B2
(45) Date of Patent: May 20, 2025

(54) CERAMIC ELECTRONIC DEVICE AND MANUFACTURING METHOD OF THE SAME

(71) Applicant: TAIYO YUDEN CO., LTD., Tokyo (JP)

(72) Inventor: Ayumi Matsuoka, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 154 days.

(21) Appl. No.: 18/189,142

(22) Filed: Mar. 23, 2023

(65) Prior Publication Data
US 2023/0317376 A1    Oct. 5, 2023

(30) Foreign Application Priority Data
Mar. 30, 2022    (JP) ................. 2022-056392

(51) Int. Cl.
| | |
|---|---|
| H01G 4/30 | (2006.01) |
| C04B 35/468 | (2006.01) |
| H01G 4/008 | (2006.01) |
| H01G 4/012 | (2006.01) |
| H01G 4/12 | (2006.01) |

(52) U.S. Cl.
CPC ........... *H01G 4/30* (2013.01); *C04B 35/4682* (2013.01); *H01G 4/008* (2013.01); *H01G 4/012* (2013.01); *H01G 4/1227* (2013.01)

(58) Field of Classification Search
CPC ...... H01G 4/008; H01G 4/012; H01G 4/1227; H01G 4/30; C04B 35/4682
See application file for complete search history.

(56) References Cited

U.S. PATENT DOCUMENTS

| | | | | |
|---|---|---|---|---|
| 2011/0157765 A1* | 6/2011 | Kim | ........................ | H01G 4/01 29/25.03 |
| 2013/0107422 A1* | 5/2013 | Lee | ...................... | H10N 30/053 336/200 |
| 2014/0311783 A1* | 10/2014 | Lee | ........................ | H01G 4/005 361/321.2 |
| 2014/0326494 A1* | 11/2014 | Chung | ..................... | H01G 4/30 361/301.4 |

(Continued)

FOREIGN PATENT DOCUMENTS

| | | | |
|---|---|---|---|
| JP | 2007258279 A | * | 10/2007 |
| WO | 2015016309 A1 | | 2/2015 |

*Primary Examiner* — Nathan Milakovich
(74) *Attorney, Agent, or Firm* — Law Office of Katsuhiro Arai

(57) ABSTRACT

A ceramic electronic device includes a multilayer chip. Internal electrode layers include a first metal and a second metal of which a melting point is lower than that of the first metal. Internal electrode layers exposed to the first end face include a first and a second internal electrode layers. In a center portion of the multilayer chip, the second internal electrode layer is exposed to the first end face with a width "b". In a lower portion, the first internal electrode layer is exposed to the first end face with a width "a". An a/b ratio is 0.3 or more and 0.8 or less. A c/d ratio which is a ratio of a total stack number "c" of the first internal electrode layer with respect to a total stack number "d" of the first internal electrode layer and the second internal electrode layer is more than 0.1.

8 Claims, 12 Drawing Sheets

(56) References Cited

U.S. PATENT DOCUMENTS

| | | | |
|---|---|---|---|
| 2015/0075854 A1* | 3/2015 | You | H01G 4/35 361/275.1 |
| 2016/0155571 A1 | 6/2016 | Doi et al. | |
| 2020/0066454 A1* | 2/2020 | Cha | H01G 4/0085 |
| 2021/0366658 A1* | 11/2021 | Yamato | H01G 4/1227 |

* cited by examiner

Comparative Example

Comparative Example

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2022-056392, filed on Mar. 30, 2022, the entire contents of which are incorporated herein by reference.

FIELD

A certain aspect of the present invention relates to a ceramic electronic device and a manufacturing method of the ceramic electronic device.

BACKGROUND

In high-frequency communication systems typified by mobile phones, there is a demand for small, large-capacity multilayer ceramic capacitors in order to add further functionality. For miniaturization and large capacity, it is effective to reduce the thickness of dielectric layers and internal electrode layers and increase the number of stacked layers. However, thinning the dielectric layer increases the electric field intensity when the capacitor is used, which is disadvantageous in terms of insulation reliability. Therefore, as a measure to ensure insulation reliability in a thin dielectric layer, adding an additive metal, which is a dissimilar metal element such as Sn, to the internal electrode layers to ensure insulation has been studied (for example, see International Publication No. 2015/016309).

SUMMARY OF THE INVENTION

According to an aspect of the present invention, there is provided a ceramic electronic device including: a multilayer chip having a parallelepiped shape in which each of a plurality of dielectric layers and each of a plurality of internal electrode layers are alternately stacked and each of the plurality of internal electrode layers is alternately exposed to a first end face and a second end face opposite to the first end face of the multilayer chip, the plurality of internal electrode layers including a first metal acting as a main component and a second metal of which a melting point is lower than that of the first metal; and external electrodes, each of which is provided respectively on the first end face and the second end face, wherein internal electrode layers exposed to the first end face include a first internal electrode layer and a second internal electrode layer, wherein, in a center portion of the multilayer chip in a stacking direction, the second internal electrode layer is exposed to the first end face with a width "b" and, in a lower portion which is located lower than the center portion and an upper portion which is located upper than the center portion, the first internal electrode layer is exposed to the first end face with a width "a", wherein an a/b ratio which is a ratio of the width "a" with respect to the width "b" is 0.3 or more and 0.8 or less, and wherein a c/d ratio which is a ratio of a total stack number "c" of the first internal electrode layer with respect to a total stack number "d" of the first internal electrode layer and the second internal electrode layer is more than 0.1.

According to another aspect of the present invention, there is provided a ceramic electronic device including: a multilayer chip having a parallelepiped shape in which each of a plurality of dielectric layers and each of a plurality of internal electrode layers are alternately stacked and each of the plurality of internal electrode layers is alternately exposed to a first end face and a second end face opposite to the first end face of the multilayer chip, the plurality of internal electrode layers including a first metal acting as a main component and a second metal of which a melting point is lower than that of the first metal; and external electrodes, each of which is provided respectively on the first end face and the second end face, wherein internal electrode layers exposed to the first end face includes a first internal electrode layer, a second internal electrode layer and a third internal electrode layer, wherein, in a center portion of the multilayer chip in a stacking direction, the second internal electrode layer is exposed to the first end face with a width "b" and, in a lower portion which is located lower than the center portion and an upper portion which is located upper than the center portion, the first internal electrode layer is exposed to the first end face with a width "a" and, between the first internal electrode layer and the second internal electrode layer, the third internal electrode layer is exposed to the first end face with a width which is between the width "a" and the width "b", wherein an a/b ratio which is a ratio of the width "a" with respect to the width "b" is 0.3 or more and 0.8 or less, and wherein an e/d ratio which is a ratio of a total stack number "e" of the first internal electrode layer and the third internal electrode layer with respect to a total stack number "d" of the first internal electrode layer, the second internal electrode layer and the third internal electrode layer is more than 0.2.

According to another aspect of the present invention, there is provided a manufacturing method of a ceramic capacitor including: forming a ceramic multilayer structure having a parallelepiped shape by alternately stacking each of a plurality of dielectric green sheets and each of a plurality of internal electrode patterns including a first metal acting as a main component and a second metal of which a melting point is lower than that of the first metal, and alternately exposing the each of a plurality of internal electrode patterns to a first end face and a second end face opposite to the first end face of the ceramic multilayer structure; forming external electrodes, each of which is provided respectively on the first end face and the second end face during a firing of the ceramic multilayer structure or after firing of the ceramic multilayer structure, wherein internal electrode layers exposed to the first end face includes a first internal electrode layer and a second internal electrode layer, wherein, in a center portion of the multilayer chip in a stacking direction, the second internal electrode layer is exposed to the first end face with a width "b" and, in a lower portion which is located lower than the center portion and an upper portion which is located upper than the center portion, the first internal electrode layer is exposed to the first end face with a width "a", wherein an a/b ratio which is a ratio of the width "a" with respect to the width "b" is 0.3 or more and 0.8 or less, and wherein a c/d ratio which is a ratio of a total stack number "c" of the first internal electrode layer with respect to a total stack number "d" of the first internal electrode layer and the second internal electrode layer is more than 0.1.

DETAILED DESCRIPTION

When a low-melting-point metal is added to the internal electrode layers as an additive metal, the mutual diffusion between the additive metal and the external electrodes increases the diffusion of metal components from the external electrodes to the internal electrode layers. A problem arises that cracks are induced in the vicinity of the electrodes.

A description will be given of an embodiment with reference to the accompanying drawings.

Figure 1:
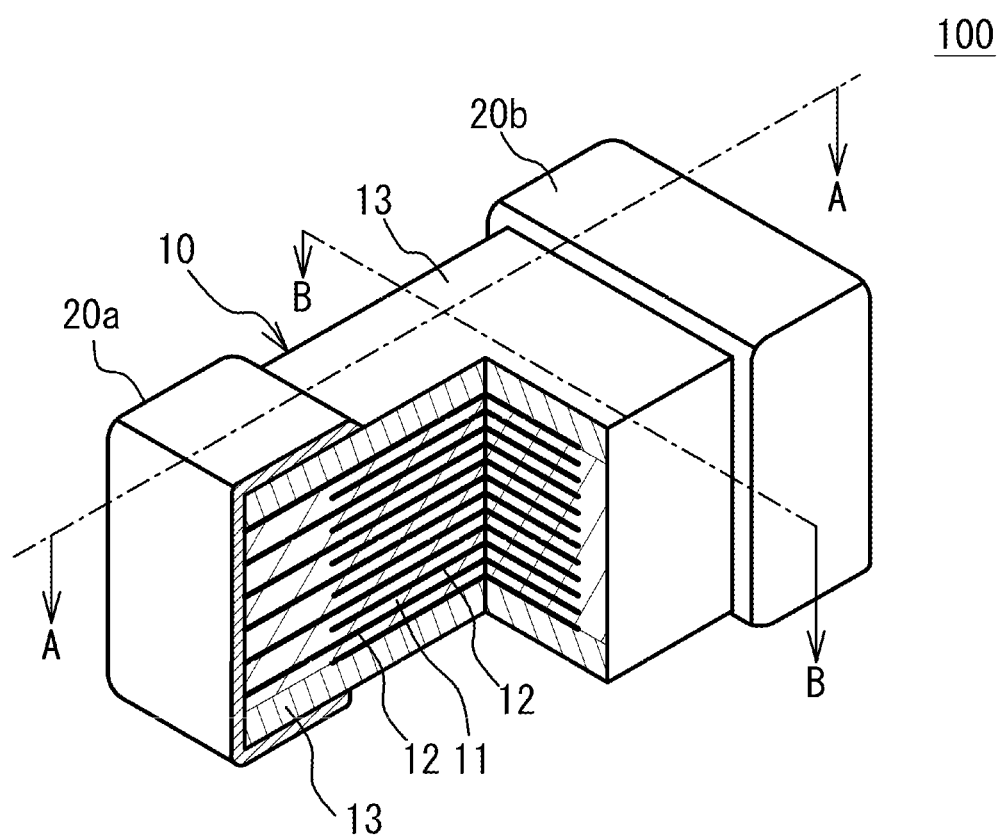
FIG. 1 illustrates a perspective view of a multilayer ceramic capacitor in which a cross section of a part of the multilayer ceramic capacitor is illustrated.
Figure 2:
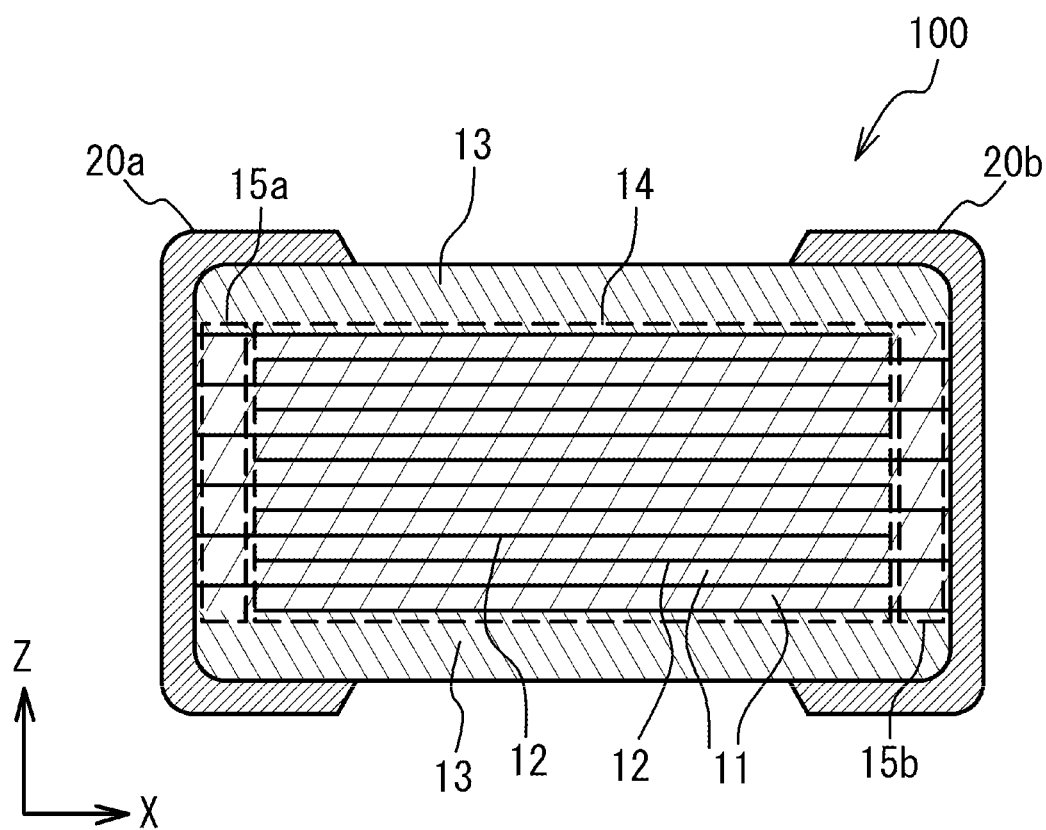
FIG. 2 illustrates a cross sectional view taken along a line A-A of FIG. 1.
Figure 3:
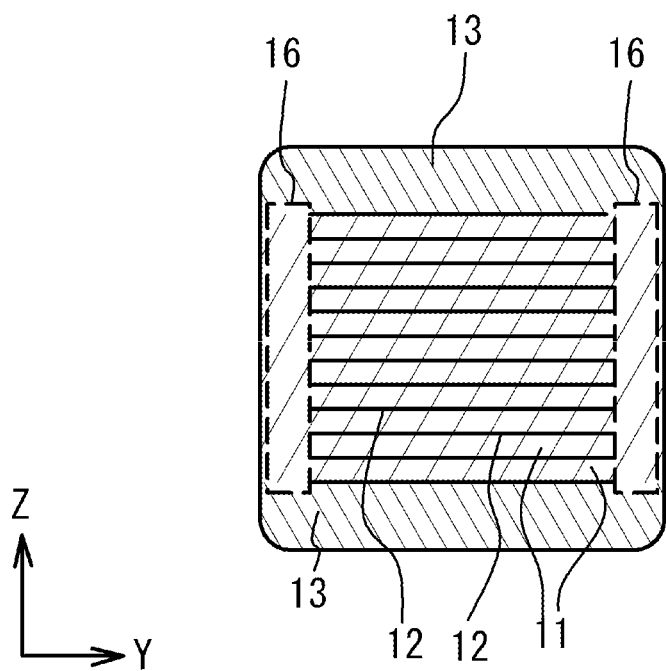
FIG. 3 illustrates a cross sectional view taken along a line B-B of FIG. 1.

(First Embodiment) FIG. 1 illustrates a perspective view of a multilayer ceramic capacitor 100 in accordance with a first embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a first metal as a main component. End edges of the internal electrode layers 12 in an extension direction thereof are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. The internal electrode layer 12 connected to the external electrode 20a is not connected to the external electrode 20b. The internal electrode layer 12 connected to the external electrode 20b is not connected to the external electrode 20a. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon.

The internal electrode layers 12 are mainly composed of base metals such as Ni, copper (Cu), and tin (Sn). As the first metal of the internal electrode layer 12, noble metals such as platinum (Pt), palladium (Pd), silver (Ag), gold (Au) or alloys containing these noble metals may be used. The internal electrode layer 12 contains a second metal having a melting point lower than that of the first metal as a dissimilar metal element.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as a first end margin 15a. A section, in which the internal electrode layers 12 connected to the external electrode 20b face each other without sandwiching the internal electrode layer 12 connected to the external electrode 20a is a second end margin 15b. That is, the end margin is a section in which a set of the internal electrode layers 12 connected to one external electrode face each other without sandwiching the internal electrode layer 12 connected to the other external electrode. The first end margins 15a and the second end margin 15b are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity. The side margin 16 may have the same composition as the composition of the dielectric layers of the capacity section 14 or may have a composition which is different from the composition of the dielectric layers of the capacity section 14.

Figure 4:
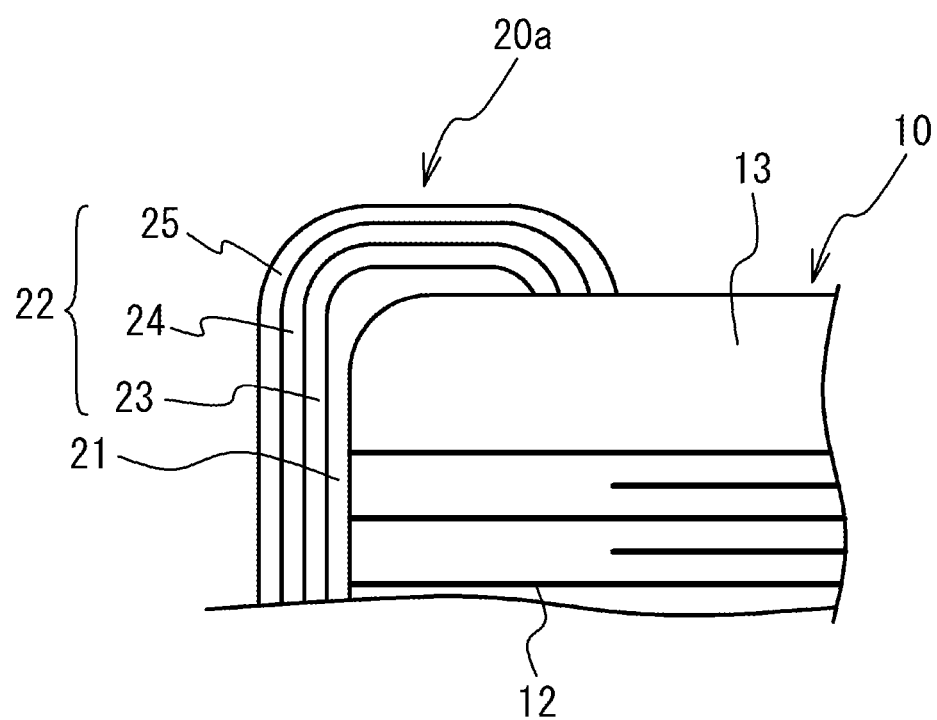
FIG. 4 illustrates an enlarged cross sectional view of a vicinity of an external electrode.

FIG. 4 is an enlarged cross-sectional view of the vicinity of the external electrode 20a. Hatches are omitted in FIG. 4. As illustrated in FIG. 4, the external electrode 20a has a structure in which a plated layer 22 is provided on a base layer 21. As illustrated in FIG. 4, the base layer 21 is mainly composed of Ni, Cu, or the like. The base layer 21 may contain ceramic particles such as $BaTiO_3$ as a co-material, or may contain a glass component. The plated layer 22 is mainly composed of a metal such as Cu, Ni, aluminum (Al), zinc (Zn), Sn, or an alloy of two or more of these metals. The plated layer 22 may be a plated layer of a single metal component, or may be a plurality of plated layers of mutually different metal components. For example, the plated layer 22 has a structure in which a first plated layer 23, a second plated layer 24 and a third plated layer 25 are formed in order from the base layer 21 side. The first plated layer 23 is, for example, a Cu plated layer. The second plated layer 24 is, for example, a Ni plated layer. The third plated layer 25 is, for example, a Sn plated layer. Although FIG. 4 illustrates the external electrode 20a, the external electrode 20b also has the same multilayer structure.

In the multilayer ceramic capacitor 100 according to the present embodiment, the internal electrode layers 12 contain, in addition to the first metal, the second metal having a melting point lower than that of the first metal. The second metals are, for example, Sn, Zn, Al, indium (In), Au, germanium (Ge), and the like. This second metal segregates between the internal electrode layer 12 and the dielectric layer 11 to form an electrical barrier. Thereby, the insulating property of the dielectric layer 11 is improved. However, if the internal electrode layer 12 is added with the second metal having the low melting point, the amount of diffusion from the external electrodes 20a and 20b to the internal electrode layer 12 increases due to mutual diffusion.

Figure 5A:
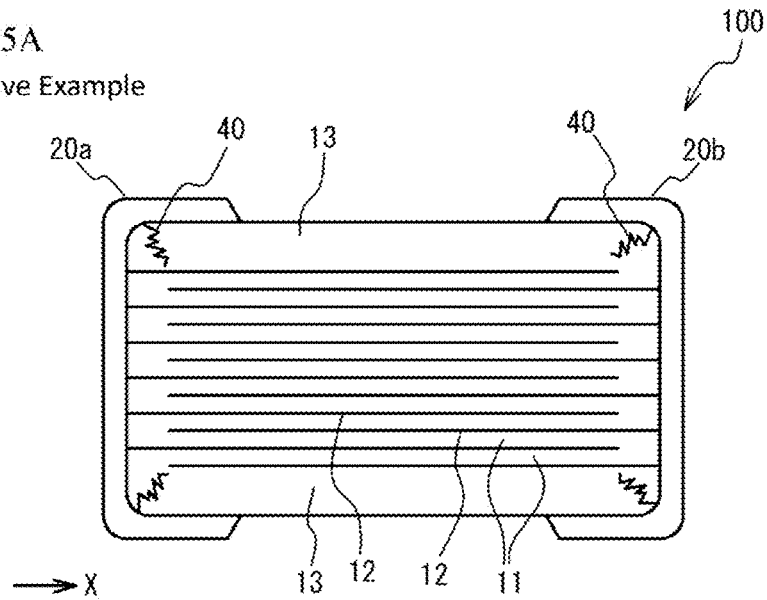
FIG. 5A and FIG. 5B illustrate a crack.

In this case, as illustrated in FIG. 5A, a crack 40 may occur due to expansion of the internal electrode layers 12 near the external electrodes 20a. Moreover, the crack 40 may occur due to the expansion of the internal electrode layers 12 near the external electrodes 20b.

Figure 5B:
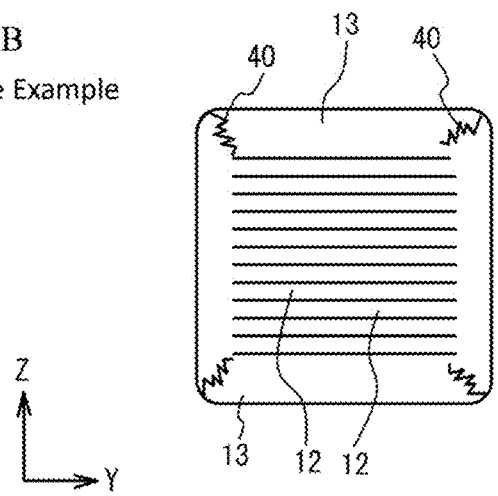

FIG. 5B is a cross-sectional view of the first end margin 15a on the YZ plane, assuming that each internal electrode layer 12 has the same width in the Y-axis direction. As illustrated in FIG. 5B, the crack 40 may occur at each corner in the YZ cross section. Also in the second end margin 15b, the crack 40 may occur at each corner of the YZ cross section.

Therefore, the multilayer ceramic capacitor 100 according to the present embodiment has a configuration capable of suppressing the occurrence of the crack at each corner while maintaining insulation.

Figure 6:
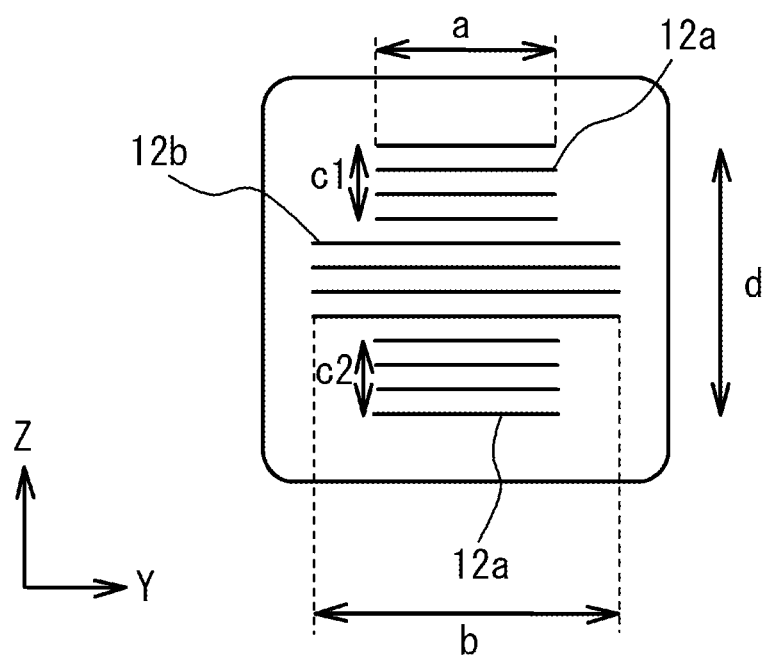
FIG. 6 is a transparent view of a first end face of a multilayer chip seen through an external electrodes.

FIG. 6 is a transparent view of the first end face of the multilayer chip 10 seen through the external electrodes 20a. As illustrated in FIG. 6, the internal electrode layers 12 exposed on the first end face include first internal electrode layers 12a and second internal electrode layers 12b. The first internal electrode layers 12a are arranged in the upper and lower portions in the stacking direction, and the second internal electrode layers 12b are arranged in the central portion in the stacking direction. In the first end face of the multilayer chip 10, the second internal electrode layers 12b are wide in the Y-axis direction, and the first internal electrode layers 12a are narrow in the Y-axis direction.

Figure 7A:
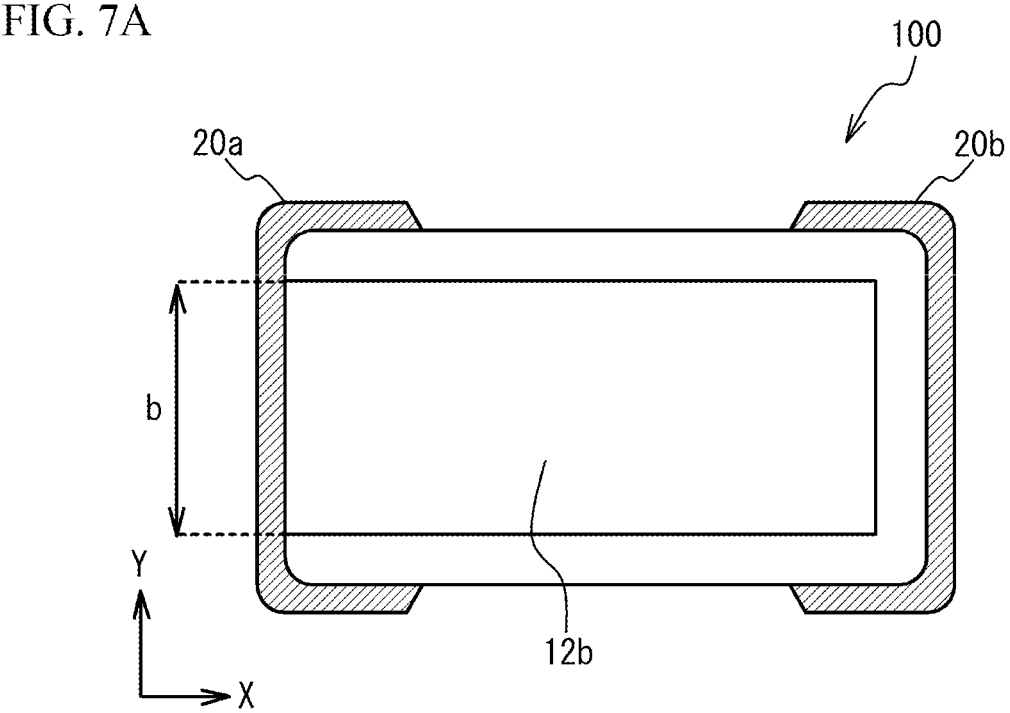
FIG. 7A is a transparent view of a second internal electrode layer when viewed from a Z-axis direction.

FIG. 7A is a transparent view of the second internal electrode layer 12b when viewed from the Z-axis direction. As illustrated in FIG. 7A, the second internal electrode layer 12b has a width "b" in the Y-axis direction. Therefore, as illustrated in FIG. 6, the second internal electrode layer 12b is exposed with the width "b" with respect to the first end face of the multilayer chip 10.

Figure 7B:
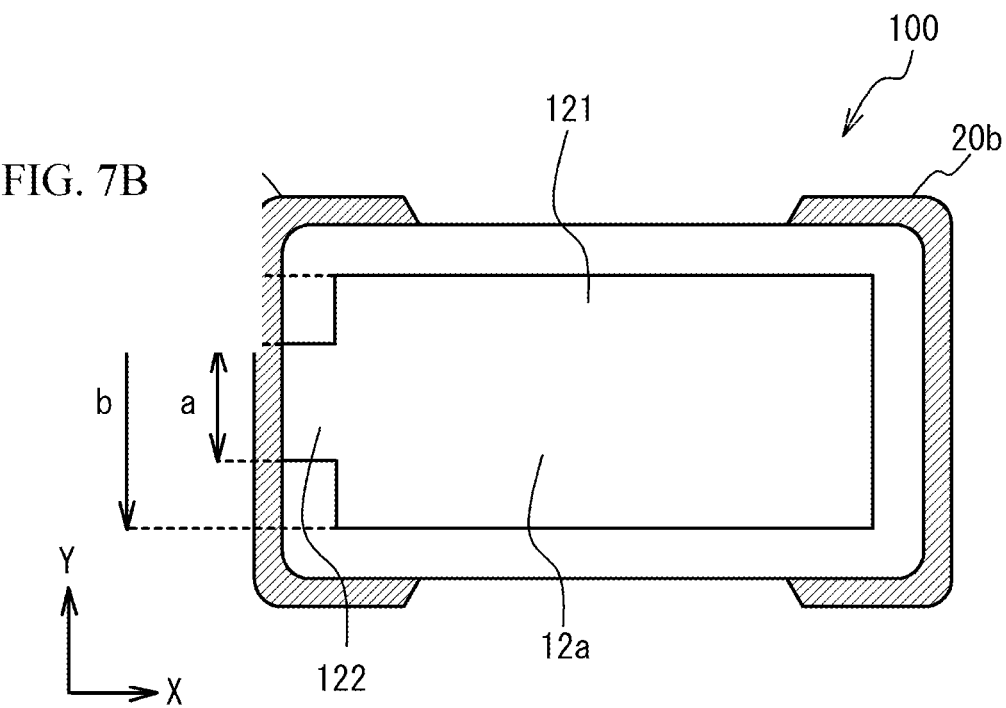
FIG. 7B is a transparent view of a first internal electrode layer when viewed from a Z-axis direction.

FIG. 7B is a transparent view of the first internal electrode layer 12a when viewed from the Z-axis direction. As illustrated in FIG. 7B, the first internal electrode layer 12a has a large width portion 121 having a larger width in the Y-axis direction and a small width portion 122 having a smaller width in the Y-axis direction than the large width portion 121 and is connected to the external electrode 20a through the small width portion 122. Therefore, the first internal electrode layer 12a is exposed with a width "a" with respect to the first end face of the multilayer chip 10. The small width portion 122 is shorter than the large width portion 121 in the X-axis direction. For example, in the X-axis direction, the large width portion 121 and the capacity section 14 have the same length, and the small width portion 122 and the first end margin 15a have the same length. Note that the first internal electrode layer 12a may not necessarily have the large width portion 121.

As exemplified in FIG. 6, the stack number "c1" of the first internal electrode layers 12a above the second internal electrode layers 12b in the stacking direction. The stack number of the first internal electrode layers 12a below the second internal electrode layers 12b in the stacking direction is defined as the stack number "c2". c=c1+c2 is the total stack number of the first internal electrode layers 12a. The stack number "c1" and the stack number "c2" are preferably the same, but may be different. In the multilayer chip 10, the total stack number of the internal electrode layers 12 is defined as the stack number "d".

In the present embodiment, since the upper and lower first internal electrode layers 12a in the stacking direction have the small width portion 122, the amount of diffusion of the metal component from the external electrode 20a to the first internal electrode layers 12a can be reduced. Thereby, the occurrence of the crack can be suppressed. Also, in the YZ cross section of the first end margin 15a, the distance between each corner of the multilayer chip 10 and the end of the first internal electrode layer 12a in the Y-axis direction increases. Thereby, it is possible to suppress the occurrence of the crack at the corners. That is, referring to FIG. 6, it can be said that the distance between the left and right ends of the first internal electrode layer 12a and each corner can be made longer. Also, the amount of the second metal diffused from the first internal electrode layer 12a to the external electrode 20a can be reduced. As a result, the effect of the second metal can be sufficiently obtained, the insulating properties of the dielectric layer 11 can be improved, and the life of the multilayer ceramic capacitor 100 can be extended.

If the small width portion 122 does not have a sufficiently small width in the Y-axis direction, there is a risk that the diffusion amount of the metal component from the external electrode 20a cannot be sufficiently reduced, the distance between each corner of the multilayer chip 10 and the first internal electrode layer 12a is not long enough in the YZ cross section of the first end margin 15a, and the crack may occur. Therefore, an upper limit is set for the a/b ratio, which is the ratio of the width "a" to the width "b". In this embodiment, the a/b ratio is 0.8 or less, preferably 0.6 or less, and more preferably 0.5 or less.

If the width of the small width portion 122 in the Y-axis direction is too small, the first internal electrode layers 12a and the external electrodes 20a may not be in sufficient contact with each other, and sufficient capacity may not be necessarily obtained. Therefore, a lower limit is set for the a/b ratio. In this embodiment, the a/b ratio is 0.3 or more, preferably 0.4 or more, and more preferably 0.6 or more.

In addition, if the number of the stacked first internal electrode layers 12a is small, there is a risk that the occurrence of the crack cannot be sufficiently suppressed. Therefore, in the present embodiment, a lower limit is set for the c/d ratio, which is the ratio of the number of the stacked layers "c" to the total number of the stacked layers "d". In this embodiment, the c/d ratio exceeds 0.1, preferably 0.2 or more, and more preferably 0.3 or more. From the viewpoint of securing contact, the c/d ratio may be 1, but is preferably less than 1, more preferably 0.5 or less.

If the amount of the second metal in the internal electrode layers 12 is small, the dielectric layers 11 may not necessarily achieve sufficient insulation. Therefore, it is preferable to set a lower limit to the amount of the second metal added to the internal electrode layers 12. For example, in the internal electrode layer 12, assuming that the amount of the first metal is 100 at %, the concentration of the second metal is preferably 0.1 at % or more, more preferably 0.3 at % or more, still more preferably 1.0 at % or more.

If the amount of the second metal in the internal electrode layer 12 is large, diffusion to the dielectric side increases, which may greatly change the dielectric properties. Therefore, it is preferable to set an upper limit for the amount of the second metal added to the internal electrode layers 12. For example, in the internal electrode layer 12, when the amount of the first metal is assumed to be 100 at %, the concentration of the second metal is preferably 3.0 at % or less, more preferably 1.5 at % or less, still more preferably 1.0 at % or less.

On the first end face of the multilayer chip 10, the first internal electrode layer 12a is exposed with the width "a". However, an error may occur. For example, on the first end face of the multilayer chip 10, the width "a" of each of the first internal electrode layers 12a may have an error of ±5% with respect to the average value. In addition, although the second internal electrode layer 12b is exposed with the width "b" on the first end face of the multilayer chip 10, an error may occur. For example, on the first end face of the multilayer chip 10, the width "b" of each of the second internal electrode layers 12b may have an error of ±5% with respect to the average value.

Although the external electrode 20a side has been described in FIG. 6 to FIG. 7B, each internal electrode layer may have the same structure on the external electrode 20b side as well.

(Second embodiment) In the first embodiment, some of the internal electrode layers 12 are the first internal electrode layers 12a, but this is not the only option. The second embodiment demonstrates a different point from the first embodiment.

Figure 8:
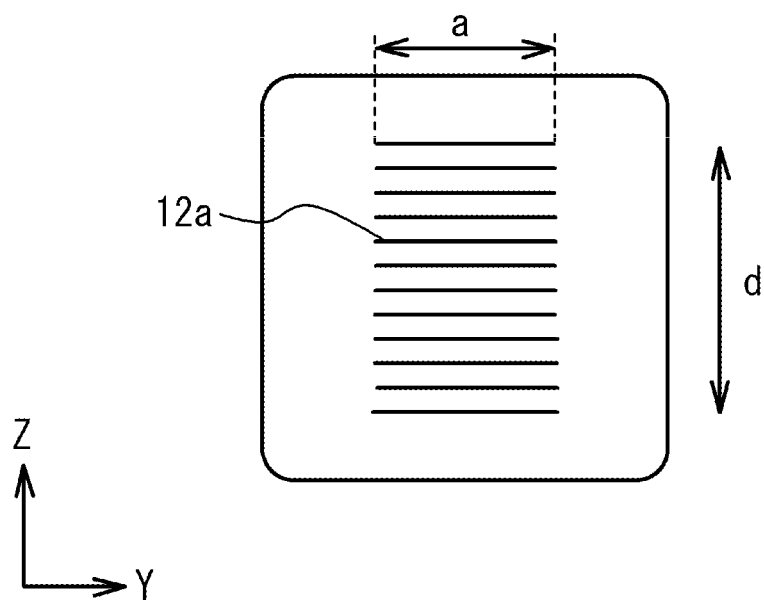
FIG. 8 is a transparent view of a first end face of a multilayer chip seen through an external electrode.

FIG. 8 is a transparent view of the first end face of the multilayer chip 10 seen through the external electrode 20a. As illustrated in FIG. 8, all of the internal electrode layers 12 are the first internal electrode layers 12a. Therefore, in the present embodiment, the number "c" of layers, which is the total number of layers of the first internal electrode layers 12a, matches the total number of layers "d". That is, the c/d ratio becomes 1.0. In this configuration, since all the internal electrode layers exposed on the first end face of the multilayer chip 10 have the small width portion 122, the diffusion amount of the metal component from the external electrode 20a to the first internal electrode layer 12a is reduced. Thereby, the occurrence of the crack can be suppressed. Also, in the YZ cross section of the first end margin 15a, the distance between each corner of the multilayer chip 10 and all of the first internal electrode layers 12a exposed on the first end face of the multilayer chip 10 is increased. Thereby, the occurrence of the crack can be more effectively suppressed. Also, the amount of the second metal diffused from the first internal electrode layer 12a to the external electrode 20a can be reduced. As a result, the effect of the second metal can be sufficiently obtained, the insulating properties of the dielectric layer 11 can be improved, and the life of the multilayer ceramic capacitor 100 can be extended.

Although FIG. 8 describes the external electrode 20a side, each internal electrode layer may have the same structure on the external electrode 20b side as well.

(Third Embodiment) In a third embodiment, points different from the first embodiment will be described. In this embodiment, the internal electrode layers 12 exposed on the first end face of the multilayer chip 10 include the first internal electrode layers 12a, the second internal electrode layers 12b, and third internal electrode layers 12c.

Figure 9:
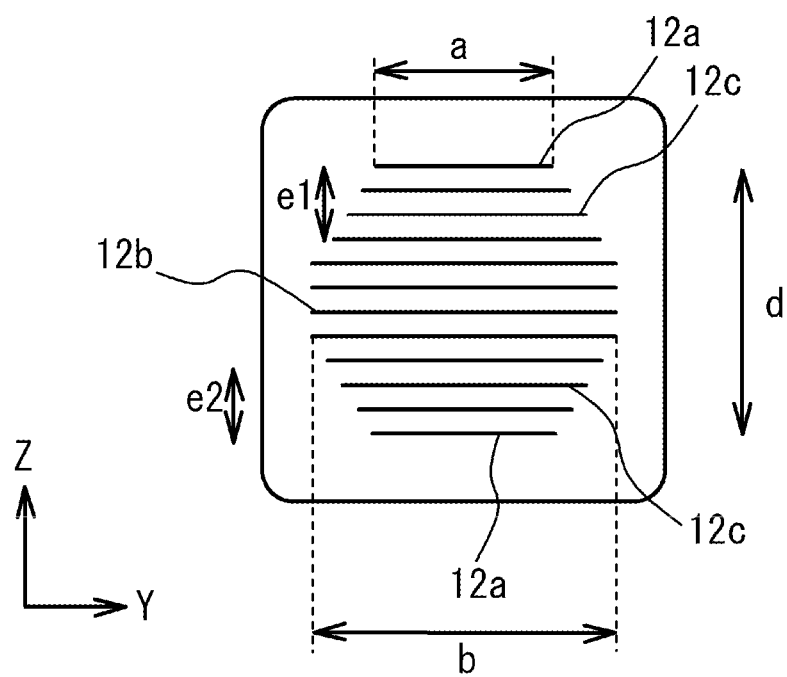
FIG. 9 is a transparent view of a first end face of a multilayer chip seen through an external electrode.

FIG. 9 is a transparent view of the first end face of the multilayer chip 10 seen through the external electrode 20a. As illustrated in FIG. 9, in the present embodiment, the first internal electrode layers 12a are arranged at the upper portion and the lower portion in the stacking direction, and the second internal electrode layers 12b are arranged at the center portion in the stacking direction, as in the first embodiment. However, one or more of the third internal electrode layers 12c are arranged between the first internal electrode layers 12a and the second internal electrode layers 12b.

Figure 10:
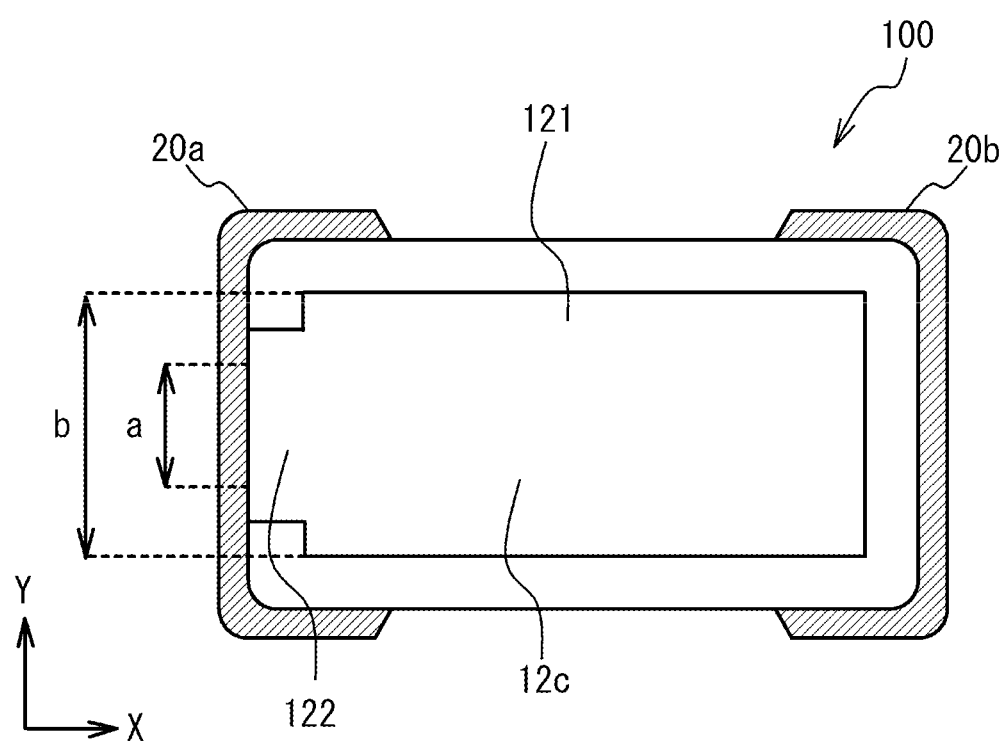
FIG. 10 is a transparent view of a third internal electrode layer when viewed from a Z-axis direction.

As illustrated in FIG. 10, the third internal electrode layer 12c has the large width portion 121 and the small width portion 122, similar to the first internal electrode layer 12a illustrated in FIG. 7B. However, the width of the small width portion 122 in the Y-axis direction is wider than the width "a" and narrower than the width "b". Therefore, on the first end face of the multilayer chip 10, the third internal electrode layer 12c is exposed with a width wider than the width "a" and narrower than the width "b". It should be noted that the third internal electrode layer 12c may not necessarily have to have the large width portion 121.

In the case where two or more of the third internal electrode layers 12c are continuous on the first end face of the multilayer chip 10, the width in the Y-axis direction gradually narrows layer by layer toward the outside in the stacking direction. For example, the width of the two adjacent internal electrode layers 12 decreases from the uppermost second internal electrode layer 12b toward the first internal electrode layer 12a above the second internal electrode layer 12b. The decreasing rate percentage ranges from 5% to 30%, alternatively from 8% to 25%, alternatively from 10% to 20%. Decreasing rate of the width of the two adjacent internal electrode layers 12 from the lowermost second internal electrode layer 12b toward the first internal electrode layer 12a below the second internal electrode layer 12b for each layer is also in the range of 5% to 30%, or in the range of 8% to 25%, or in the range of 10% to 20%.

In the present embodiment, as exemplified in FIG. 9, the total stack number of the third internal electrode layers 12c and the first internal electrode layers 12a above the uppermost second internal electrode layer 12b is defined as the stack number "e1". Below the lowermost second internal electrode layer 12b, the total number of stacked layers of the third internal electrode layer 12c and the first internal electrode layer 12a is defined as the stack number of "e2". The total stack number of the third internal electrode layers 12c and the first internal electrode layers 12a is set to e=e1+e2. The stack number "e1" and the stack number "e2" are preferably the same, but may be different.

In the present embodiment, since the upper and lower first internal electrode layers 12a and the upper and lower third internal electrode layers 12c in the stacking direction have the small width portion 122, it is possible to reduce the diffusion amount of the metal component from the external electrode 20a to the first internal electrode layers 12a and the third internal electrode layers 12c. Thereby, the occurrence of the crack can be suppressed. Also, in the YZ cross section of the first end margin 15a, the distances between each corner of the multilayer chip 10 and the first internal electrode layer 12a and the third internal electrode layer 12c are increased. Thereby, it is possible to suppress the occurrence of the crack at the corners. Moreover, the amount of the second metal diffused from the first internal electrode layer 12a and the third internal electrode layer 12c to the external electrode 20a can be reduced. As a result, the effect of the second metal can be sufficiently obtained, the insulating properties of the dielectric layer 11 can be improved, and the life of the multilayer ceramic capacitor 100 can be extended.

If the stack number "e" is small, the occurrence of the crack may not be sufficiently suppressed. Therefore, in the present embodiment, a lower limit is set for the e/d ratio, which is the ratio of the stack number "e" to the total stack number "d". In this embodiment, the e/d ratio is greater than 0.2, preferably 0.25 or greater, and more preferably 0.3 or greater.

Although FIG. 9 and FIG. 10 describe the external electrode 20a side, each internal electrode layer may have a similar structure on the external electrode 20b side.

Figure 11:
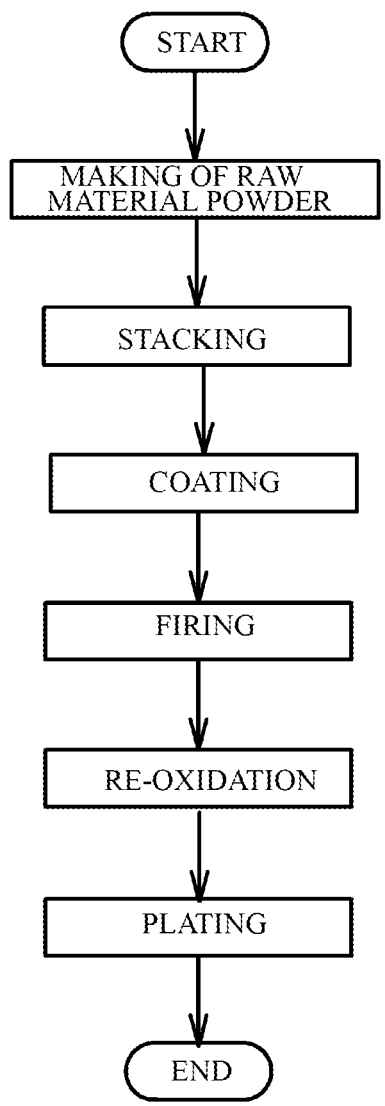
FIG. 11 illustrates a manufacturing method of a multilayer ceramic capacitor.

Next, a method for manufacturing the multilayer ceramic capacitors 100 according to the first to third embodiments will be described. FIG. 11 is a diagram illustrating the flow of the manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co (cobalt), Ni (nickel), Li (lithium), B (boron), Na (sodium), K (potassium) or Si (silicon), or a glass including cobalt, nickel, lithium, boron, sodium, potassium or silicon. Among the additive compounds, $SiO_2$ acts as a sintering assistant.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is formed on a base material 51 by, for example, a die coater method or a doctor blade method, and then dried. The base material 51 is, for example, PET (polyethylene terephthalate) film.

Figure 12A:
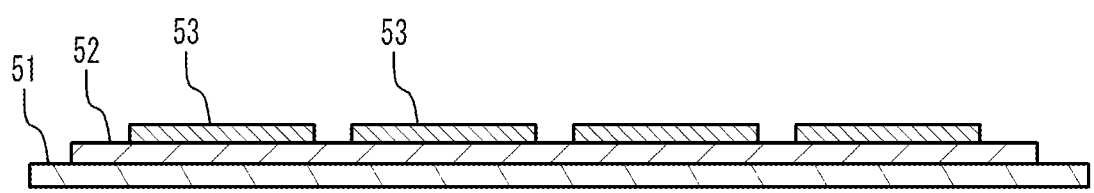
FIG. 12A and FIG. 12B illustrate a stacking process.

Next, as illustrated in FIG. 12A, an internal electrode pattern 53 is formed on the dielectric green sheet 52. In FIG. 12A, as an example, four parts of the internal electrode pattern 53 are formed on the dielectric green sheet 52 and are spaced from each other. The dielectric green sheet 52 on which the internal electrode pattern 53 is formed is a stack unit.

For the internal electrode pattern 53, a metal paste of the first metal of the internal electrode layer 12 is used. The method of film formation may be printing, sputtering, vapor deposition, or the like. The shape of each of the internal electrode patterns 53 corresponds to the first internal electrode layer 12a, the second internal electrode layer 12b, and the third internal electrode layer 12c. The internal electrode pattern 53 corresponding to the first internal electrode layer 12a may be printed to have the shape of the first internal electrode layer 12a, or may be printed using a mask to have the shape of the first internal electrode layer 12a. The internal electrode pattern 53 corresponding to the third internal electrode layer 12c may be printed to have the shape of the third internal electrode layer 12c, or may be printed using a mask to have the shape of the third internal electrode layer 12c.

Figure 12B:
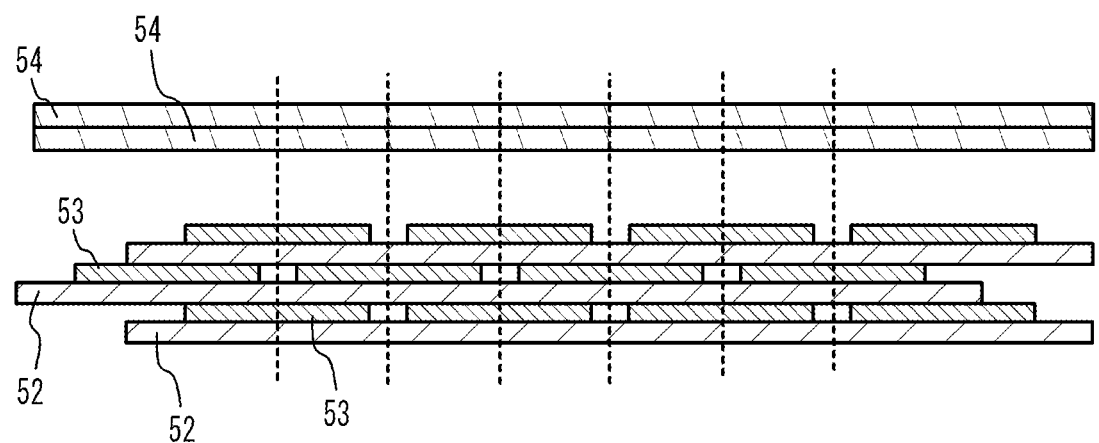

Next, the dielectric green sheets 52 are peeled from the base materials 51. As illustrated in FIG. 12B, the stack units are stacked.

Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 12B, the multilayer structure is cut along a dotted line. The components of the cover sheet 54 may be the same as those of the dielectric green sheet 52. Alternatively, the additive in the cover sheet 54 may be different from that in the dielectric green sheet 52.

(Coating process) The ceramic multilayer structure thus obtained is subjected to a binder removal treatment in an $N_2$ atmosphere. And then, an external electrode paste, which will be the base layer 21, is applied on the ceramic multilayer structure by a dipping method or the like. The external electrode paste includes a co-material. The two end faces of the ceramic multilayer structure to which the internal electrode patterns 53 are exposed are coated with the external electrode paste.

(Firing process) The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. Thus, the multilayer chip 10 and the base layer 21 can be fired together with each other.

(Re-oxidizing process) After that, a re-oxidation process may be performed in $N_2$ gas atmosphere at 600 degrees C. to 1000 degrees C.

(Plating process) After that, by a plating process, the plated layer is formed on the base layer 21. For example, plated layer includes Cu, Ni, Sn and so on. Thus, the multilayer ceramic capacitor 100 is obtained.

Note that the base layer 21 does not have to be fired at the same time as the multilayer chip 10. For example, the first and second end faces of the multilayer chip 10 obtained by firing are coated with a metal paste, which will be the base layer 21 of the external electrodes 20a and 20b, by a dipping method or the like. The metal paste contains a glass component. After that, the base layer 21 is formed by baking the metal paste at, for example, about 700 degrees C. to 900 degrees C. After that, the plated layer 22 may be formed.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) An internal electrode pattern was printed on the dielectric green sheet by adding 0.3 at % of Sn to the Ni paste with respect to Ni. 500 layers of the obtained stack units were stacked, sandwiched between cover sheets, pressure-bonded, and cut into a predetermined shape to obtain a compact. A multilayer chip was obtained by firing the compact. A metal paste containing Cu as a main component was applied to the two end faces of the multilayer chip and baked at around 800° C. The resulting multilayer ceramic capacitor had a 1005 shape (length 1.0 mm, width 0.5 mm, height 0.5 mm). The thickness of each dielectric layer was 0.6 μm. The a/b ratio was set to 0.6 and the c/d ratio was set to 0.2. Therefore, the structure of Example 1 corresponds to the first embodiment. In each internal electrode layer, the length of the small width portion in the X-axis direction was matched with the length of the end margin in the X-axis direction. The stack number "c1" was the same as the stack number "c2".

(Example 2) In Example 2, Sn was added to the Ni paste by 1.0 at % with respect to Ni, and an internal electrode pattern was printed on the dielectric green sheet. In the internal electrode pattern, the a/b ratio was set to 0.6 and the c/d ratio was set to 0.2. Therefore, the structure of Example 2 corresponds to the first embodiment. Other conditions were the same as in Example 1.

(Example 3) In Example 3, Sn was added to the Ni paste by 2.8 at % with respect to Ni, and an internal electrode pattern was printed on the dielectric green sheet. In the internal electrode pattern, the a/b ratio was set to 0.6 and the c/d ratio was set to 0.2. Therefore, the structure of Example 3 corresponds to the first embodiment. Other conditions were the same as in Example 1.

(Example 4) In Example 4, Sn was added to the Ni paste by 1.0 at % with respect to Ni, and an internal electrode pattern was printed on the dielectric green sheet. In the internal electrode pattern, the a/b ratio was set to 0.3 and the c/d ratio was set to 0.2. Therefore, the structure of Example 4 corresponds to the first embodiment. Other conditions were the same as in Example 1.

(Example 5) In Example 5, Sn was added to the Ni paste by 1.0 at % with respect to Ni, and an internal electrode pattern was printed on the dielectric green sheet. In the internal electrode pattern, the a/b ratio was set to 0.6 and the c/d ratio was set to 1.0. Therefore, the structure of Example 5 corresponds to the second embodiment. Other conditions were the same as in Example 1.

(Comparative example 1) In Comparative Example 1, Sn was added to the Ni paste by 1.0 at % with respect to Ni, and an internal electrode pattern was printed on the dielectric green sheet. In the internal electrode pattern, the a/b ratio was set to 0.6 and the c/d ratio was set to 0.05. Other conditions were the same as in Example 1.

(Comparative example 2) In Comparative Example 2, Sn was added to the Ni paste by 1.0 at % with respect to Ni, and an internal electrode pattern was printed on the dielectric green sheet. In the internal electrode pattern, the a/b ratio was set to 0.9 and the c/d ratio was set to 0.2. Other conditions were the same as in Example 1.

(Comparative Example 3) In Comparative Example 3, Sn was added to the Ni paste by 1.0 at % with respect to Ni, and an internal electrode pattern was printed on the dielectric green sheet. In the internal electrode pattern, the a/b ratio was set to 0.2 and the c/d ratio was set to 0.2. Other conditions were the same as in Example 1.

In each of Examples 1 to 5 and Comparative Examples 1 to 3, a segregation layer of Sn was confirmed between the internal electrode layer and the dielectric layer.

(Analysis) For Examples 1 to 5 and Comparative Examples 1 to 3, reliability tests, moisture resistance tests, and capacity measurements were performed.

In the reliability test, a voltage of 6.3 V was applied at 85° C. for 1000 hours and 2000 hours, and then left at room temperature for 24 hours, after which the insulation resistance was evaluated. An insulation resistance value of less than 10 MΩ was regarded as failure. If no failure occurred even after 1000 hours, it was judged as good "○". If no failure occurred even after 2000 hours, it was judged as very good "double circle". If failure occurred after less than 1000 hours, it was judged as bad "x".

In the humidity resistance test, the insulation resistance was evaluated after applying the voltage for 1000 hours and 2000 hours in an environment of 85° C.-85% RH and then left at room temperature for 24 hours. An insulation resistance value of less than 10 MΩ was regarded as failure. If no failure occurred even after 1000 hours, it was judged as good "○". If no failure occurred even after 2000 hours, it was judged as very good "double circle". If failure occurred after less than 1000 hours, it was judged as bad "x".

In the capacity test, the sample was left at 150° C. for 1 hour, then under standard conditions for 24 hours, and then measured using an LCR meter under the conditions of 0.5V-1 kHz. When the measured capacity was 20 g or more, it was judged as good. When the measured capacity was less than 20 μF, it was judged as bad.

If the reliability test, moisture resistance test, and capacity test were not judged to be bad, the overall judgment was "passed". If any one of the reliability test, the moisture resistance test, and the capacity test was judged to be bad, the overall judgment was "failed". Table 1 shows the results.

As shown in Table 1, all of Comparative Examples 1 to 3 were judged to be "failed", but all of Examples 1 to 5 were judged to be "passed". This is because Examples 1 to 5 satisfied the conditions of 0.3≤a/b ratio≤0.8 and the conditions of 0.1<c/d ratio, so cracks were prevented from occurring while maintaining insulating properties. In Comparative Examples 1 and 2, cracks were confirmed.

(Example 7) In Example 7, Sn was added to the Ni paste by 1.0 at % with respect to Ni, and an internal electrode pattern was printed on the dielectric green sheet. In the internal electrode pattern, the a/b ratio was set to 0.6 and the e/d ratio was set to 0.3. Other conditions were the same as in Example 6.

(Example 8) In Example 8, 2.8 at % of Sn was added to the Ni paste with respect Ni, and an internal electrode pattern was printed on the dielectric green sheet. In the internal electrode pattern, the a/b ratio was set to 0.6 and the e/d ratio was set to 0.3. Other conditions were the same as in Example 6.

(Example 9) In Example 9, Sn was added to the Ni paste by 1.0 at % with respect to Ni, and an internal electrode pattern was printed on the dielectric green sheet. In the internal electrode pattern, the a/b ratio was set to 0.3 and the e/d ratio was set to 0.3. Other conditions were the same as in Example 6.

(Comparative Example 4) In Comparative Example 4, Sn was added to the Ni paste by 1.0 at % with respect to Ni, and an internal electrode pattern was printed on the dielectric green sheet. In the internal electrode pattern, the a/b ratio was set to 0.6 and the e/d ratio was set to 0.2. Other conditions were the same as in Example 6.

(Comparative Example 5) In Comparative Example 5, Sn was added to the Ni paste by 1.0 at % with respect to Ni, and an internal electrode pattern was printed on the dielectric green sheet. In the internal electrode pattern, the a/b ratio was set to 0.9 and the e/d ratio was set to 0.3. Other conditions were the same as in Example 6.

(Comparative Example 6) In Comparative Example 6, Sn was added to the Ni paste by 1.0 at % with respect to Ni, and an internal electrode pattern was printed on the dielectric green sheet. In the internal electrode pattern, the a/b ratio was set to 0.2 and the e/d ratio was set to 0.3. Other conditions were the same as in Example 6.

In each of Examples 6 to 9 and Comparative Examples 4 to 6, a segregation layer of Sn was confirmed between the internal electrode layer and the dielectric layer.

TABLE 1

| | FIRST | SECOND | ADDED AMOUNT (at %) | a/b | c/d | RELIABILTY | CAPACITY (μF) | HUMIDITY RESISTANCE | JUDGE |
|---|---|---|---|---|---|---|---|---|---|
| EXAMPLE 1 | Ni | Sn | 0.3 | 0.6 | 0.2 | ○ | 22 | ○ | PASSED |
| EXAMPLE 2 | Ni | Sn | 1.0 | 0.6 | 0.2 | ○ | 22 | ○ | PASSED |
| EXAMPLE 3 | Ni | Sn | 2.8 | 0.6 | 0.2 | ⊙ | 22 | ○ | PASSED |
| EXAMPLE 4 | Ni | Sn | 1.0 | 0.3 | 0.2 | ⊙ | 22 | ○ | PASSED |
| EXAMPLE 5 | Ni | Sn | 1.0 | 0.6 | 1.0 | ○ | 22 | ○ | PASSED |
| COMPARATIVE EXAMPLE 1 | Ni | Sn | 1.0 | 0.6 | 0.05 | ○ | 22 | X | FAILED |
| COMPARATIVE EXAMPLE 2 | Ni | Sn | 1.0 | 0.9 | 0.2 | ○ | 22 | X | FAILED |
| COMPARATIVE EXAMPLE 3 | Ni | Sn | 1.0 | 0.2 | 0.2 | ○ | 17 | ○ | FAILED |

Subsequently, a multilayer ceramic capacitor according to the third embodiment was manufactured and its characteristics were investigated.

(Example 6) In Example 6, 0.3 at % of Sn was added to the Ni paste with respect to Ni, and an internal electrode pattern was printed on the dielectric green sheet. In the internal electrode pattern, the a/b ratio was set to 0.6 and the e/d ratio was set to 0.3. The stack number "e1" was the same as the stack number "e2". Other conditions were the same as in Example 1.

(Analysis) For Examples 6 to 9 and Comparative Examples 4 to 6, reliability tests, moisture resistance tests, and capacity measurements were performed in the same manner as Examples 1 to 5 and Comparative Examples 1 to 3. Criteria for the reliability test, moisture resistance test, and capacitance test were the same as in Examples 1 to 5 and Comparative Examples 1 to 3. Table 2 shows the results.

As shown in Table 2, all of Comparative Examples 4 to 6 were judged to be "failed", but all of Examples 6 to 9 were judged to be "passed". This is because Examples 6 to 9 satisfied the conditions of 0.3≤a/b ratio≤0.8 and the conditions of 0.2<e/d ratio, so cracks were prevented from occurring while maintaining insulation. In addition, in Comparative Examples 4 and 5, crack generation was confirmed.

TABLE 2

| | FIRST | SECOND | ADDED AMOUNT (at %) | a/b | e/d | RELIABILTY | CAPACITY (μF) | HUMIDITY RESISTANCE | JUDGE |
|---|---|---|---|---|---|---|---|---|---|
| EXAMPLE 6 | Ni | Sn | 0.3 | 0.6 | 0.3 | ○ | 22 | ○ | PASSED |
| EXAMPLE 7 | Ni | Sn | 1.0 | 0.6 | 0.3 | ○ | 22 | ○ | PASSED |
| EXAMPLE 8 | Ni | Sn | 2.8 | 0.6 | 0.3 | ⊚ | 22 | ○ | PASSED |
| EXAMPLE 9 | Ni | Sn | 1.0 | 0.3 | 0.3 | ⊚ | 22 | ○ | PASSED |
| COMPARATIVE EXAMPLE 4 | Ni | Sn | 1.0 | 0.6 | 0.2 | ○ | 22 | X | FAILED |
| COMPARATIVE EXAMPLE 5 | Ni | Sn | 1.0 | 0.9 | 0.3 | ○ | 22 | X | FAILED |
| COMPARATIVE EXAMPLE 6 | Ni | Sn | 1.0 | 0.2 | 0.3 | ○ | 17 | ○ | FAILED |

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip having a parallelepiped shape in which each of a plurality of dielectric layers and each of a plurality of internal electrode layers are alternately stacked and each of the plurality of internal electrode layers is alternately exposed to a first end face and a second end face opposite to the first end face of the multilayer chip, the plurality of internal electrode layers including a first metal acting as a main component and a second metal of which a melting point is lower than that of the first metal; and
external electrodes, each of which is provided respectively on the first end face and the second end face,
wherein internal electrode layers exposed to the first end face includes a first internal electrode layer, a second internal electrode layer and a third internal electrode layer,
wherein, in a center portion of the multilayer chip in a stacking direction, the second internal electrode layer is exposed to the first end face with a width "b" and, in a lower portion which is located lower than the center portion and an upper portion which is located higher than the center portion, the first internal electrode layer is exposed to the first end face with a width "a" and, between the first internal electrode layer and the second internal electrode layer, the third internal electrode layer is exposed to the first end face with a width which is between the width "a" and the width "b",
wherein an a/b ratio which is a ratio of the width "a" with respect to the width "b" is 0.3 or more and 0.8 or less, and
wherein an e/d ratio which is a ratio of a total stack number "e" of the first internal electrode layer and the third internal electrode layer with respect to a total stack number "d" of the first internal electrode layer, the second internal electrode layer and the third internal electrode layer is more than 0.2.

2. The ceramic electronic device as claimed in claim 1, wherein a decreasing rate of widths of internal electrode layers adjacent to each other is within 5% to 30% from the second internal electrode layer toward the first internal electrode layer.

3. The ceramic electronic device as claimed in claim 1, wherein a stack number "e1" of the first internal electrode layer and the third internal electrode layer which are located higher than the second internal electrode layer in the stacking direction is equal to a stack number "e2" of the first internal electrode layer and the third internal electrode layer which are located lower than the second internal electrode layer.

4. The ceramic electronic device as claimed in claim 1,
wherein the first internal electrode layer has a large width portion having the width "b" and a small width portion having the width "a" smaller than the width "b",
wherein the small width portion of the first internal electrode layer is exposed to the first end face,
wherein the third internal electrode layer has a large width portion having the width "b" and a small width portion having a width between the width "a" and the width "b",
wherein the small width portion of the third internal electrode layer is exposed to the first end face.

5. The ceramic electronic device as claimed in claim 1, wherein an amount of the second metal with respect to the first metal is 0.1 at % or more and 3.0 at % or less.

6. The ceramic electronic device as claimed in claim 1, wherein the second metal includes at least one of Sn, Zn, Al, In, Au and Ge.

7. The ceramic electronic device as claimed in claim 1, wherein a layer of the external electrode which contacts the first end face includes Cu as a main component.

8. A manufacturing method of a ceramic electronic device comprising:
forming a ceramic multilayer structure having a parallelepiped shape by alternately stacking each of a plurality of dielectric green sheets and each of a plurality of internal electrode patterns including a first metal acting as a main component and a second metal of which a melting point is lower than that of the first metal, and alternately exposing the each of a plurality of internal electrode patterns to a first end face and a second end face opposite to the first end face of the ceramic multilayer structure; and
forming external electrodes, each of which is provided respectively on the first end face and the second end face during a firing of the ceramic multilayer structure or after firing of the ceramic multilayer structure,
wherein internal electrode layers formed from the internal electrode patterns exposed to the first end face includes a first internal electrode layer, a second internal electrode layer, and a third internal electrode layer,
wherein, in a center portion of the multilayer chip in a stacking direction, the second internal electrode layer is exposed to the first end face with a width "b" and, in a lower portion which is located lower than the center portion and an upper portion which is located higher than the center portion, the first internal electrode layer is exposed to the first end face with a width "a" and, between the first internal electrode layer and the second internal electrode layer, the third internal electrode layer is exposed to the first end face with a width which is between the width "a" and the width "b", wherein an a/b ratio which is a ratio of the width "a" with respect to the width "b" is 0.3 or more and 0.8 or less, and wherein an e/d ratio which is a ratio of a total stack number "e" of the first internal electrode layer and the third internal electrode layer with respect to a total stack number "d" of the first internal electrode layer, the second internal electrode layer and the third internal electrode layer is more than 0.2.

* * * * *